Sept. 20, 1927.

C. BOUIN 1,642,918

CINEMATOGRAPHIC PICTURE WITH STEREOSCOPIC QUALITIES

Filed Jan. 26, 1922  3 Sheets-Sheet 1

INVENTOR=
Charles Bouin.

Sept. 20, 1927.

C. BOUIN 1,642,918

CINEMATOGRAPHIC PICTURE WITH STEREOSCOPIC QUALITIES

Filed Jan. 26, 1922    3 Sheets-Sheet 2

INVENTOR=
Charles Bouin.

INVENTOR:
Charles Bouin.

Patented Sept. 20, 1927.

1,642,918

UNITED STATES PATENT OFFICE.

CHARLES BOUIN, OF BOSTON, MASSACHUSETTS.

CINEMATOGRAPHIC PICTURE WITH STEREOSCOPIC QUALITIES.

Application filed January 26, 1922. Serial No. 531,935.

This invention involves both the arts of stereoscopic photography and motion picture photography, the two being combined, and with other features to be mentioned, constitutes an improvement in both arts. The invention relates more particularly to a standard size motion picture film upon which are photographed stereoscopically, images of scenes or objects; one or more images of scenes or objects being contained within the standard space area of 1 inch by ¾ inch; each stereoscopic pair of left and right angle images upon negative or positive moving picture film, being equal to or greater than the normal binocular distance.

Further objects and advantages of the present invention will be pointed out in the hereinafter following description of one embodiment hereon, or will be obvious to those skilled in the mentioned arts.

Some of the objects of this invention being to produce upon a standard size moving picture film, negative or positive images of scenes or objects stereoscopically photographed and maintaining between the two images of a stereoscopic pair a distance equal to or greater than the normal distance of the two eyes; also each standard size space area of 1 inch by ¾ inch which is ordinarily consumed for one image is made use of in this invention in such a manner that the space area of 1 inch by ¾ inch contains two or more images, thereby giving us economy of film.

In projection of ordinary moving pictures it requires the projection of about 16 images per second in order to convey a proper sensation of motion. With the stereoscopic film 16 images would also be sufficient in number per second in order to convey a proper sensation of relief.

Figure 6:
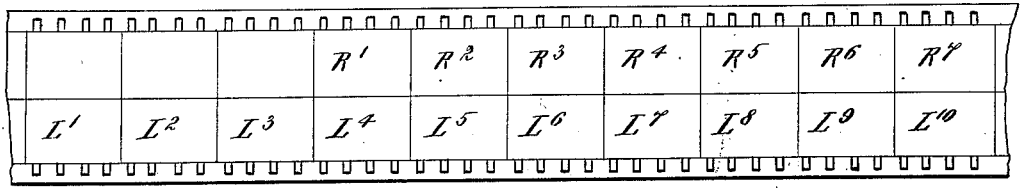
Figure 8:
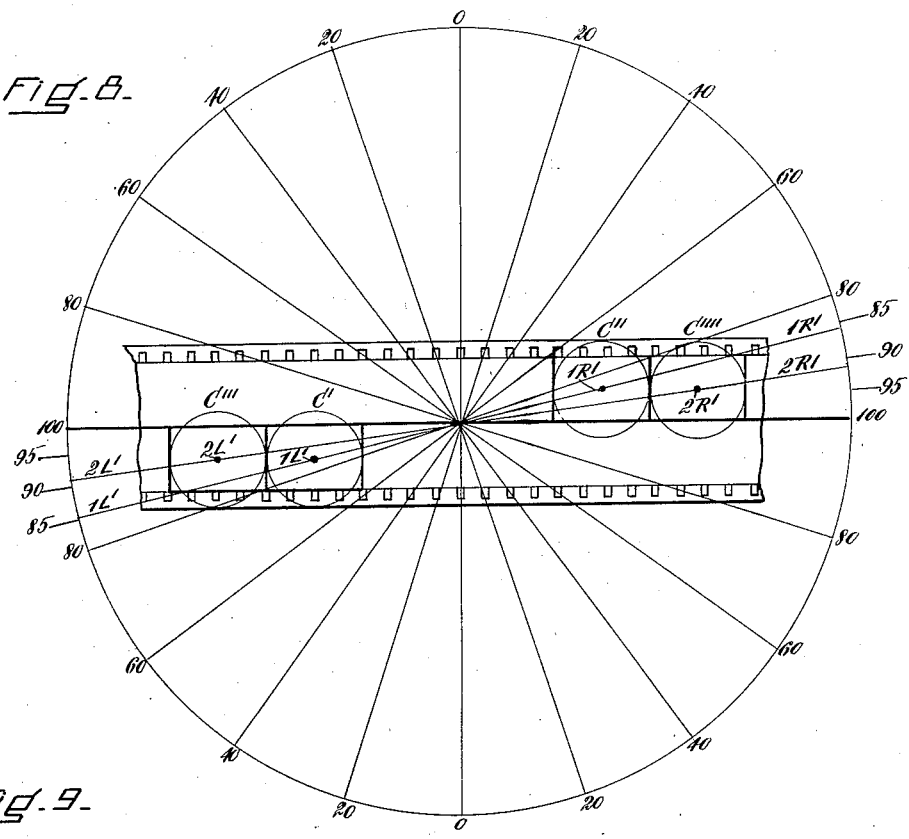

In the moving picture stereoscopic negative or positive film as shown in Fig. 6, the right and left images are photographed from two different points in space equal to or preferably greater than the normal distance of separation of both eyes, for reasons now to be described: Referring to Fig. 8, the circles as represented by $C'$, $C''$, $C'''$, and $C''''$, represents different positions of lenses and heavy dots in centre of circles represents centre of lenses. The horizontal line which is marked 100 at each end is the direction in which perception of relief is the greatest. All other lines whose ends are numbered on outside of large circle, represents different directions of stereoscopic differences and the numbers represent the percentage of perception of relief from stereoscopic differences when the eyes are in the horizontal direction of the line 100 and the stereoscopic differences in the direction as indicated by the different lines. With the film in the horizontal position, and the lenses in position $C'$ and $C''$, the direction of stereoscopic differences will be as indicated by ILI and IRI. Superimposing the two images and maintaining the upright position of the images in relation to the horizontal line perception of relief will be approximately 87 per cent. By increasing the distance of the lenses to positions $C'''$ and $C''''$ as indicated in Fig. 8, the direction of stereoscopic differences will be as indicated by the line marked 2LI and 2RI. Superimposing the two images and maintaining the upright position of the images in relation to the horizontal line, perception of relief will be approximately 92 per cent, plus the enhancement produced by virtue of the taking or photographing of the two images from points of distances of the two lenses which is greater than the normal distance of separation of both eyes.

Figure 3:
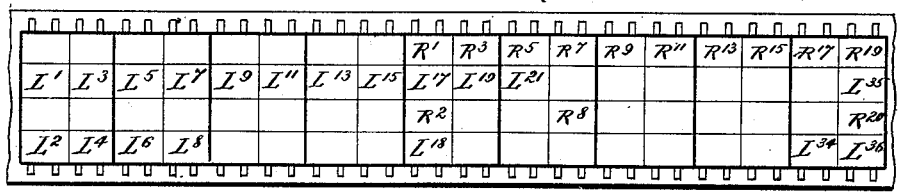
Figure 9:
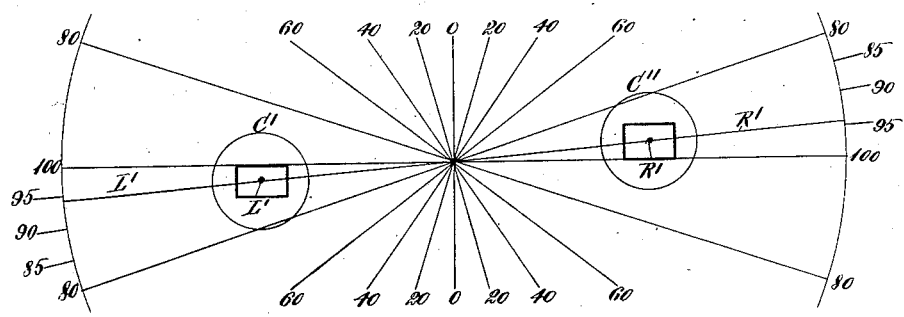

In the moving picture stereoscopic film as indicated by Fig. 3, the negative images (right and left pairs) are photographed from two different points in space equal to or preferably greater than the normal distance of separation of both eyes, for reasons which have already been described: Referring to Fig. 9, it is to be noticed that the distances between the center of the two lenses is less than the distances between the two lenses in Fig. 8, as indicated by $C'''$ and $C''''$, in Fig. 8, and yet the percentage of perception of relief is greater in Fig. 9, for the reason that the size of images are less, vertically. With the film in the horizontal position, and the lenses in position $C'$ and $C''$, as in Fig. 9, the direction of stereoscopic differences will be in a direction as indicated by the lines marked LI and RI. By such a direction of stereoscopic differences and maintaining the upright position of the images in relation to the horizontal line, perception of relief will be approximately 94 per cent, plus the enhancement produced by virtue of the photographing of the two images from points of distance of the two lenses from each other which is greater than the normal distance of separation of both eyes. All pairs of right and left images being photographed at the same time.

Figure 10:
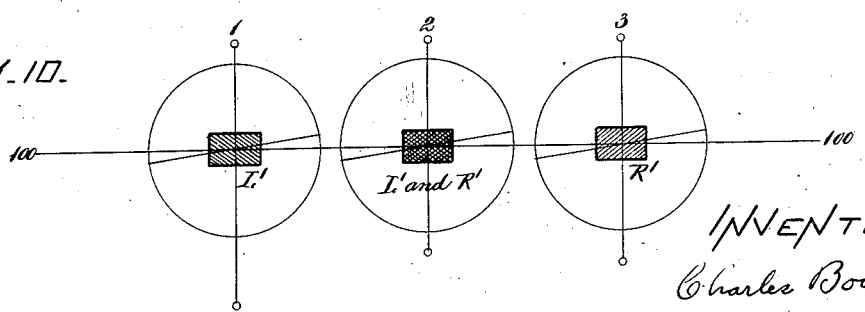

With the left angle image and right angle image superimposed and the vertical direction of pictures or images being maintained in relation to the horizontal line, as indicated by 3 in Fig. 10, the direction of stereoscopic differences and degree of deviation from the horizontal line remains the same, with perception of relief approximately 94 per cent, plus.

Figure 4:
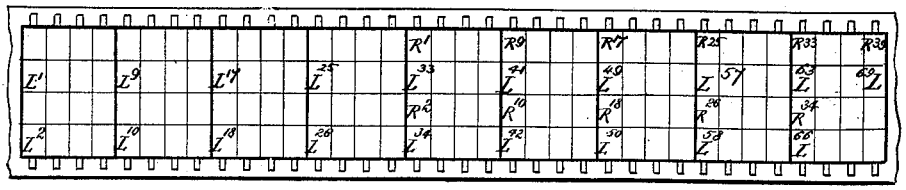

In the different negative and positive moving picture films which are representative of stereoscopic pairs of images and as indicated by Figs. 1, 2, 5, 6, and 7, the exposures for such images may be made intermittently or stereoscopic pairs may be made at the same time of exposure. In the styles of film as indicated by Figs. 3 and 4, the two images composing a stereoscopic pair are photographed at the same time of exposure. The relation of the positions of left and right pairs of images as indicated by corresponding numbers is a true representation of the direction of stereoscopic differences, the same also representing the distance of the lenses from which the images were photographed; such two different points, positions or horizontal distances in space corresponding to or being greater than binocular distances; the space area of one inch by ¾ inch containing either one, two, four, eight, or sixteen pictures or images and such images within the same space area of one inch by ¾ inch are not stereoscopic pairs, each one of a stereoscopic pair of images is located in another and different space area of one inch by ¾ inch. The images representative of stereoscopic values are photographed upon a standard size film. All images are on one side only of film.

Figure 5:
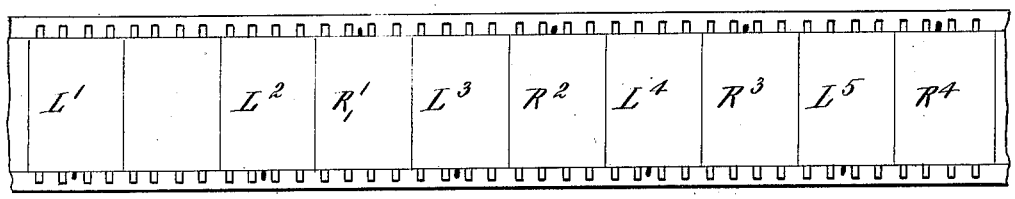

The moving picture negative or positive film representative of stereoscopic images as indicated by Fig. 5, has one image or picture within the space area of one inch by ¾ inch. All images being in alinement across length of film horizontally and the two images that compose a stereoscopic pair being separated by two spaces of one inch by ¾ inch each, each space being ¾ inch horizontally. The right and left stereoscopic pairs of images represent the two different angle points of direction from which the images are photographed. Each image has four holes perforations on edges of film. The perforated holes are of standard size, shape and distance from each other; the left angle images have marks of identification on lower edge of film and right angle images have marks of identification on upper edge of film.

Figure 7:
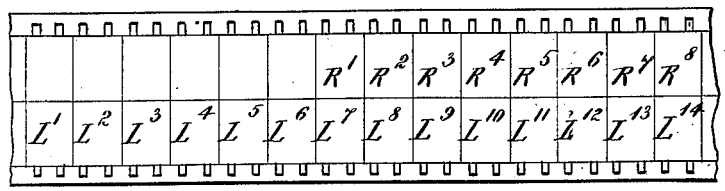

In the styles of film as indicated by Figs. 6 and 7, all images representing those photographed from one angle point or position, such as L in Figs. 6 and 7 representing left angle images, are below horizontal centre of film and in direction of length of film and all images representing those photographed from another angle point or position, are above horizontal centre of film and in direction of length of film, as indicated by numbers in rotation and R in Figs. 6 and 7 representing right angle images.

In all the different styles of film mentioned in this invention, the position on film of the right and left pairs of stereoscopic images represents the two different angle points of position, direction and distance from which such images are photographed.

Figure 1:
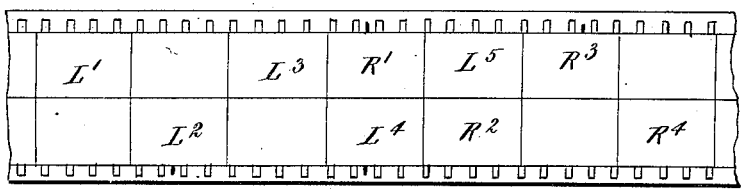
Figure 2:
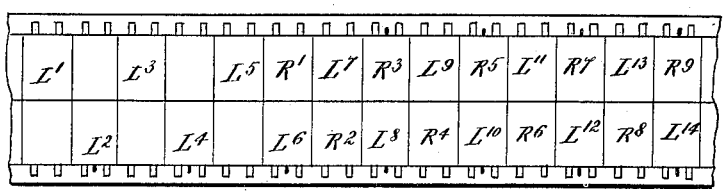

In Figs. 6 and 1, each image has four perforated holes on edge of film; in Figs. 2 and 7, each image has two perforated holes on edge of film; in Fig. 3, the images nearest edges of film have two perforated holes on edge of film; in Fig. 4, the images nearest edges of film have one perforated hole on edge of film.

In Figs. 1, 2, and 5, all right angle images have a mark of identification on upper edge of film and all left angle images having a mark of identification on lower edge of film.

In all of the different styles of film mentioned all images are on one side only of film.

In Fig. 5, only one image occupies the space area of one inch by ¾ inch; in Figs. 1 and 6, two images occupy a space area of one inch by ¾ inch; in Figs. 2 and 7, four images occupy a space area of one inch by ¾ inch; in Fig. 3, eight images occupy a space area of one inch by ¾ inch; in Fig. 4, sixteen images occupy a space area of one inch by ¾ inch.

When more than one image of scene or object is contained within the same space area of one inch by ¾ inch, such two or more images within the same space area of one inch by ¾ inch are not stereoscopic pairs properly belonging to each other; the right and left images composing a stereoscopic pair properly belonging to each other being located in different space areas of one inch by ¾ inch.

In all the different styles of film mentioned the right and left images composing a stereoscopic pair have a distance of separation which is equal to or more than the normal distance of the two eyes in relation to each other.

I do not confine myself to the particular style of film or position of images here shown, but various other changes and modifications, within the skill of those versed in the art, may be made in the different styles of film images and positions of such images shown and described herein, without departing from the spirit of my invention provided the principle set forth in the following claim be employed.

Having thus described my invention, I claim:—

A stereoscopic motion picture film having lengthwise thereon a row of consecutively adjacent images, said images being inverted and arranged in stereoscopic pairs with the corresponding images of each pair spaced apart with two images of other stereoscopic pairs therebetween, each stereoscopic pair of images having their directions of stereoscopic differences opposite in relation to each other.

This specification signed this 19th day of January, 1922.

CHARLES BOUIN.